US005529395A

United States Patent [19]
French

[11] Patent Number: 5,529,395
[45] Date of Patent: Jun. 25, 1996

[54] STRETCHABLE GIFT WRAPPING WITH SELF FORMING BOW

[76] Inventor: Judith A. French, 402 Lakeview Ave., Duluth, Minn. 55812

[21] Appl. No.: 320,938

[22] Filed: Oct. 11, 1994

[51] Int. Cl.⁶ .......................... B65D 33/28; B65D 30/02
[52] U.S. Cl. .......................... 383/75; 383/118; 229/87.03; 229/87.19
[58] Field of Search ..................... 383/24, 71, 72, 383/74, 75, 76, 118; 229/87.03, 87.18, 87.19; 150/154

[56] References Cited

U.S. PATENT DOCUMENTS

| | | |
|---|---|---|
| 791,677 | 6/1905 | Dowling ........................ 383/76 X |
| 1,706,330 | 3/1929 | Sorg ............................... 383/75 |
| 2,035,384 | 3/1936 | Hinchliff ....................... 383/118 X |
| 2,565,283 | 8/1951 | Throckmorton .............. 383/118 X |
| 2,711,234 | 6/1955 | Rubens ......................... 383/118 X |
| 3,276,671 | 10/1966 | Fleitman . | 
| 3,322,176 | 5/1967 | Geller ........................... 383/118 X |
| 4,608,283 | 8/1986 | White . |
| 4,777,066 | 10/1988 | White et al. . |
| 5,004,144 | 4/1991 | Selga . |
| 5,186,988 | 2/1993 | Dixon . |
| 5,308,080 | 5/1994 | Lamle ........................... 383/4 X |
| 5,456,062 | 10/1995 | Wechsler ...................... 383/118 X |

FOREIGN PATENT DOCUMENTS

| | | | |
|---|---|---|---|
| 1419898 | 10/1965 | France ........................ 383/76 |
| 273619 | 10/1913 | Germany ................... 383/4 |

*Primary Examiner*—Jes F. Pascua
*Attorney, Agent, or Firm*—Richard C. Litman

[57] ABSTRACT

A reusable gift wrapping having an adjustable main body that conforms to the size of a gift item to be covered. This main body is fabricated from a stretchable and flexible material (e.g. spandex), and it includes an interior surface and a decorative exterior surface. When the gift item is placed on the interior surface, the main body can be wrapped around the gift item to entirely enclose it within the main body. A decorative trim is attached to the circumference of the main body, and is a self forming bow that substantially conceals the circumferential edge of the main body when the main body is encircling the gift item. A draw string is either woven through the edge of the main body of the gift wrapping or is inserted in and through a sleeve provided by a hem sewn in the edge of the gift wrapping main body.

10 Claims, 4 Drawing Sheets

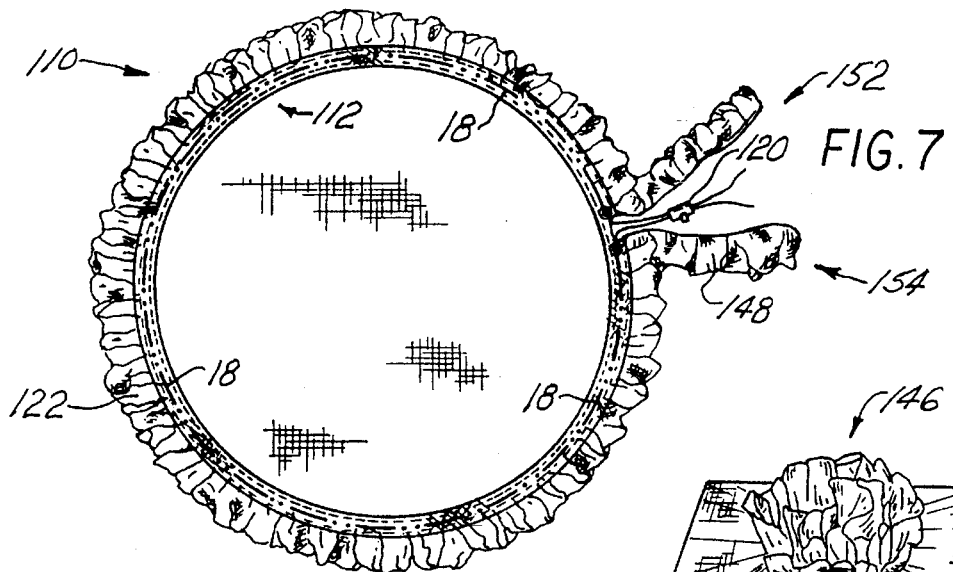
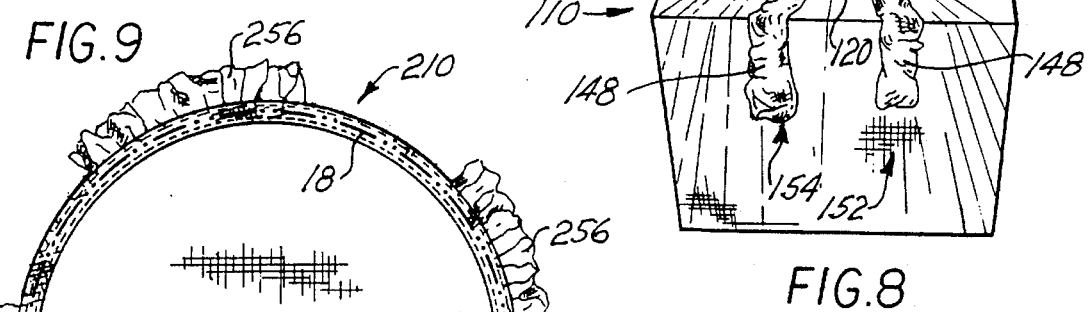
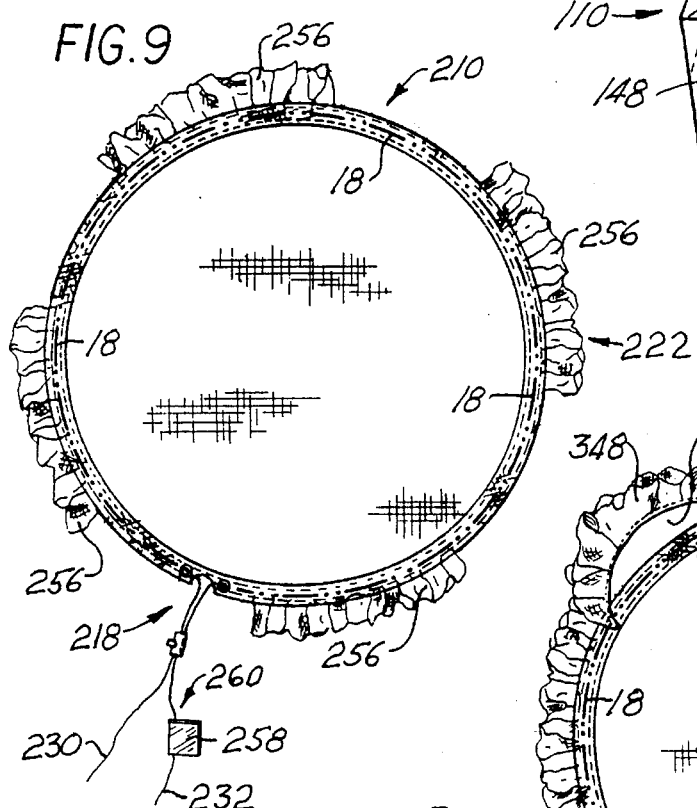
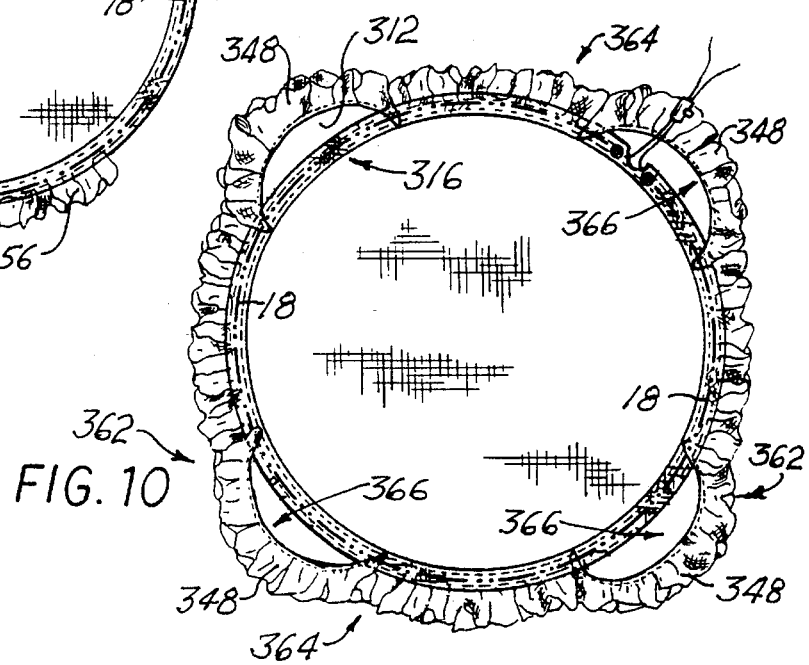

STRETCHABLE GIFT WRAPPING WITH SELF FORMING BOW

BACKGROUND OF THE INVENTION

1. Field of the Invention

The present invention relates to a reusable gift wrapping. More specifically, the present invention relates to a decorative gift wrapping having a central portion fabricated from a stretchable and flexible material.

2. Description of the Prior Art

The prior art includes many inventions concerning different gift wrappings. In U.S. Pat. No. 3,276,671 issued to Dennis L. Fleitman on Oct. 4, 1966, there is disclosed a gift wrapping constructed in the shape of a conventional bag or tube, and fabricated primarily from paper. A stretchable insert extends the length of one of the wrapping surfaces. This stretchable insert permits the gift wrapping to distend under excessive tensile pressure, therefore minimizing tearing and splitting of the paper.

In U.S. Pat. No. 4,608,283 issued to R. A. White on Aug. 26, 1986, and U.S. Pat. No. 4,777,066 issued to R. A. White et al. on Oct. 11, 1988, there are disclosed gift packages having decorative self forming bows. These bows each include an inside ribbon generally extending around the circumference of the respective gift package. A portion of this ribbon protrudes outward from the package and is covered by an outside ribbon. The protruding portion of the inside ribbon is attached to the outside ribbon at spaced apart locations, and the ends of the outside ribbon are secured to the surface of the gift package. When the ends of the inside ribbon are drawn away from the package, the inside ribbon acts as a draw string to close the gift package. The draw string movement of the inside ribbon causes the outside ribbon to form a plurality of decorative loops.

Other gift wrappings are illustrated in U.S. Pat. No. 5,186,988 issued to M. Dixon on Feb. 16, 1993, and U.S. Pat. No. 5,004,144 issued to B. J. Selga on Apr. 2, 1991. The gift wrapping shown in the Dixon patent is fabricated as a monolithic, one piece body of undefined length. This body includes a plurality of spaced apart tear line pairs. The distance between each tear line pair is a bag forming section, and a tear off strip is formed between the tear lines of each tear line pair. After a bag and tear off strip have been removed from the body of undefined length, gift articles can be placed into the removed bag, and the tear off strip can be utilized to tie the open portion of the bag.

The Selga patent teaches a reusable gift wrapping, preferably fabricated from cotton. This gift wrapping is formed as a cruciform having a decorative surface and four outwardly directed foldable flaps. A gift to be wrapped is placed upon the central portion of the cruciform, and the flaps are folded appropriately to cover the gift. Hook and loop material is utilized to secure the flaps together. If desired, hook and loop material could also be utilized to attach such items as a fabric bow and a fabric card holder to the decorative surface of the gift wrapping.

None of the above inventions and patents, taken either singly or in combination, is seen to describe the instant invention as claimed.

SUMMARY OF THE INVENTION

The present invention is a reusable gift wrapping having an adjustable main body that conforms to the size of a gift item to be covered. This main body is fabricated from a stretchable and flexible material, and it includes an interior surface and a decorative exterior surface. When the gift item is placed on the interior surface, the main body can be wrapped around the gift item to entirely enclose it within the main body. A draw string facilitates closure of the main body, and a clasp attached to the draw string secures the positioning of the main body around the gift item. A decorative trim is attached to the circumference of the main body, and is a self forming bow that substantially conceals the circumferential edge of the main body.

Accordingly, it is a principal object of the invention to provide a novel gift wrapping capable of being utilized with gift items of varying dimensions.

It is another object of the invention to provide a novel gift wrapping that is reusable.

It is a further object of the invention to provide a novel gift wrapping that is easily secured around, and removed from, a gift item.

Still another object of the invention is to provide a novel gift wrapping having a decorative, self forming bow.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 7 is a top plan view of an open position of a second embodiment of the gift wrapping of the invention.

FIG. 8 is an environmental, perspective view of a closed position of the gift wrapping shown in FIG. 7.

FIG. 9 is a top plan view of an open position of a third embodiment of the gift wrapping of the invention.

FIG. 10 is a top plan view of an open position of a fourth embodiment of the gift wrapping of the invention.

DETAILED DESCRIPTION OF THE PREFERRED EMBODIMENTS

Figure 1:
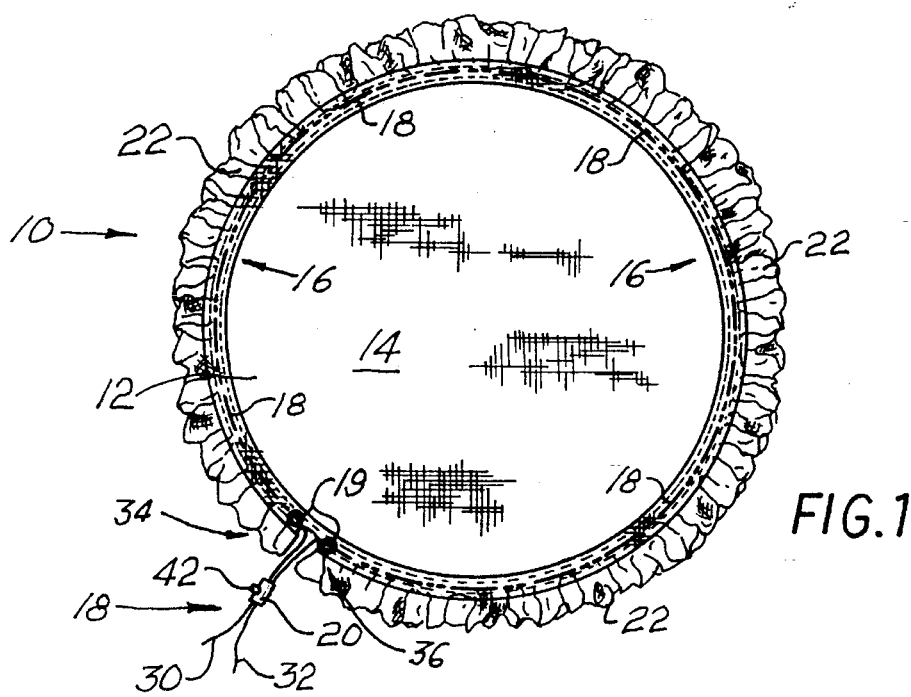
FIG. 1 is a top plan view of an open position of a first embodiment of the gift wrapping of the invention.

Referring to FIG. 1, the present invention is a reusable gift wrapping 10 having a main body 12 constructed from a central portion 14 and a draw string mounting portion 16. Central portion 14 is circular in appearance, and is fabricated entirely from a generally flat, planar, stretchable and flexible material, such as "Lycra", a brand of spandex, a nylon/spandex blend, or other, suitable, stretchy fabric or material. Draw string mounting portion 16 is located adjacent to the circumference of edge portion 17 (shown in FIG. 2), and it includes a draw string 18 slidably disposed therein. A standard clasp 20 is secured to draw string 18, and a decorative trim 22 is attached circumferentially to draw string mounting portion 16 of main body 12.

Figure 12:
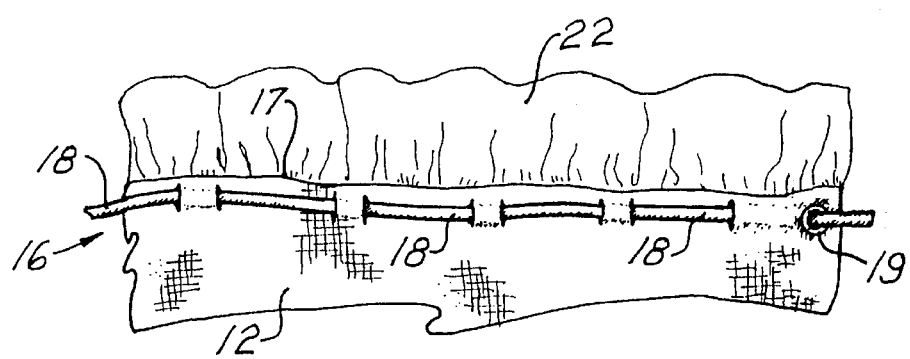
FIG. 12 is a fragmentary, detail view showing a preferred embodiment of a drawstring for closing the wrapping, the drawstring being woven through the edge of the main body of the gift wrapping.

With particular reference to FIG. 12, a preferred embodiment of the drawstring mounting portion 16 is illustrated. The drawstring is woven through main body 12, adjacent circumference 17. One or more hole reinforcing grommets 19 are provided, particularly at the point where the drawstring 18 exits the material, as is clearly seen in FIG. 1. Of course, if desired, all of the holes formed by weaving the drawstring 18 as shown may be provided with individual reinforcing grommets 19.

In FIG. 1, draw string 18 is illustrated to have a first extent 30 and a second extent 32. First extent 30 protrudes outward from draw string mounting portion 16 at a first location 34, and second extent 32 protrudes outward from draw string mounting portion 16 at a second location 36. These locations 34, 36 are proximate to each other so that simultaneous displacement of first and second extents 30, 32 constricts the opening 38 formed by circumference of gift wrapping 10.

Figure 11:
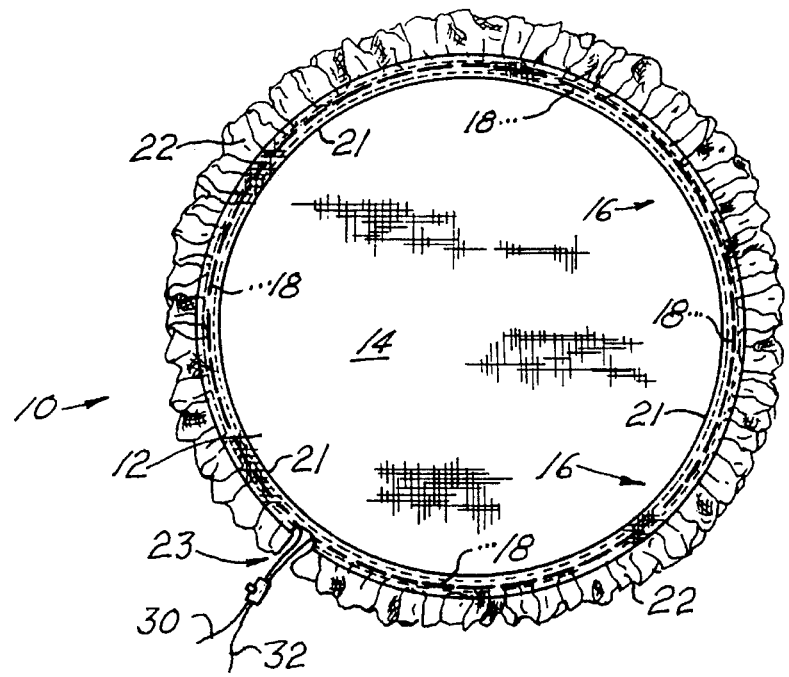
FIG. 11 is a top plan view of an open position of a second embodiment of the gift wrapping of the invention.
Figure 13:
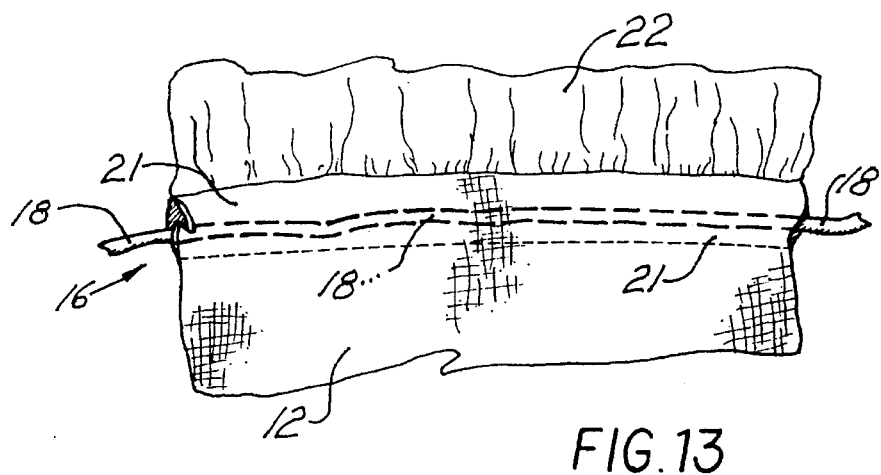
FIG. 13 is a fragmentary, detail view showing another embodiment of a drawstring structure, similar to FIG. 11, but showing the drawstring threaded through a sleeve formed by a hem in the edge of the main body of the gift wrapping.

With reference to FIGS. 11 and 13, a second embodiment of the drawstring mounting portion 16 is illustrated. In this embodiment, a sleeve 21 is formed about the edge 17 of the main body 12, and the sleeve is formed by sewing a hem in the main body edge 17, as is illustrated in FIG. 13. Drawstring 18 is then simply threaded through the sleeve 21. If desired, as seen in FIG. 11, the point of exit 23 of drawstring 18 from the sleeve 21, thus to form the extents 30 and 32, may be provided with a grommet (not shown); alternatively, two exit openings, each with a grommet, may be provided (not shown).

Figure 2:
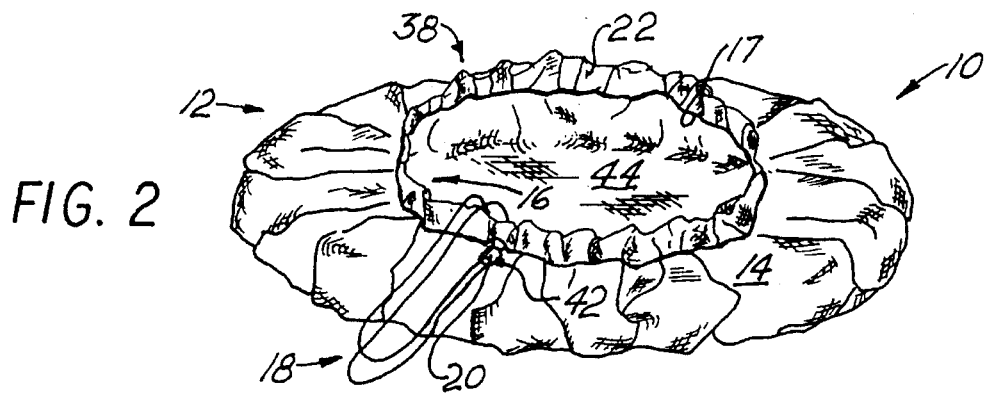
FIG. 2 is a perspective view of a partially closed position of the gift wrapping shown in FIG. 1.

In FIG. 1, main body 12 is illustrated in an open configuration, where draw string 18 has not been displaced in a manner that constricts the circumference of gift wrapping 10. In FIG. 2, draw string 18 has been slightly displaced from draw string mounting portion 16, placing main body 12 in a partially closed position. Gift wrapping 10 is maintained in this configuration by clasp 20, which prevents the size of opening 38 from increasing. To alter the size of opening 38, button 42 is depressed to relax the frictional engagement between clasp 20 and draw string 18. With button 42 depressed, the location of clasp 20 along draw string 18 can be altered. Upon releasing button 42, clasp 20 is secured to draw string 18 at the location where button 42 was released.

As illustrated in FIG. 2, the size of opening 38 decreases as main body 12 is maneuvered into a closed position. If main body 12 is placed in the closed position around a large gift item that requires substantial stretching of main body, draw string 18 could be adjusted so that gift wrapping 10 will be maintained in a position where opening 38 is modestly sized. However, if the gift item is of a size that does not require substantial stretching of main body 12, draw string 18 could be adjusted so that gift wrapping 10 is maintained in a position where draw string mounting portion 16 is so tightly constricted that opening 38 is virtually closed. In either situation, the circular shape of gift wrapping 10 minimizes the likelihood that diametrically opposed sections of the material forming opening 38 will overlap or interfere with each other when main body 12 is moved into a closed position. If, by way of contrast, gift wrapping 12 were constructed in a shape having corners or the like, there is a high probability that such corners would interfere with other portions of gift wrapping 12 when gift wrapping 12 is in a closed position. This interference would cause crowding of the material which could result in unsightly wrinkles or corrugations.

Figure 3:
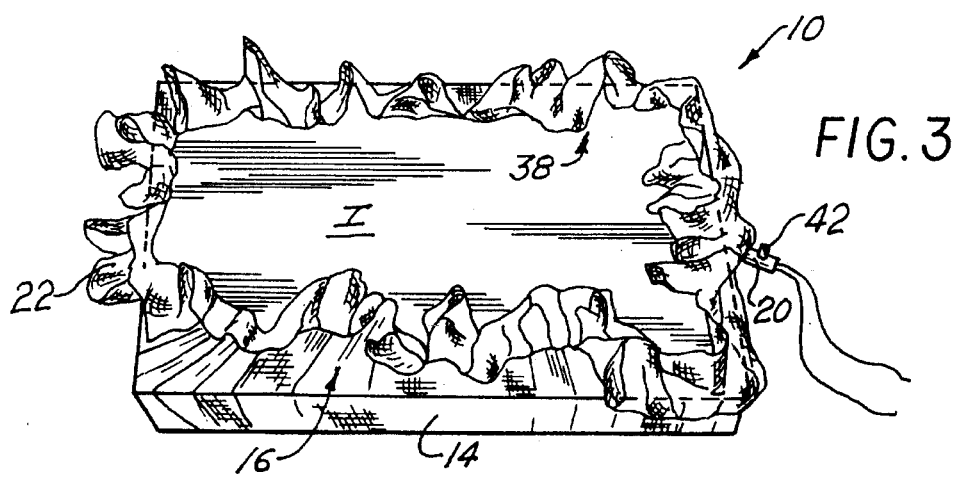
FIG. 3 is an environmental, perspective view of the partially closed position of the gift wrapping shown in FIG. 1.

Referring now to FIG. 3, gift wrapping 12 is illustrated to be slightly closed around a standard gift item or box I. To completely enclose this gift item I within gift wrapping 10, button 42 is depressed, and draw string 18 is displaced appropriately until main body 12 is in a closed configuration, shown in FIG. 4. Clasp 20 is appropriately secured to maintain main body 12 in this closed position, and the slack of draw string 18 is concealed within opening 38. This manner of concealing draw string 18 is also illustrated in FIG. 2.

Figure 4:
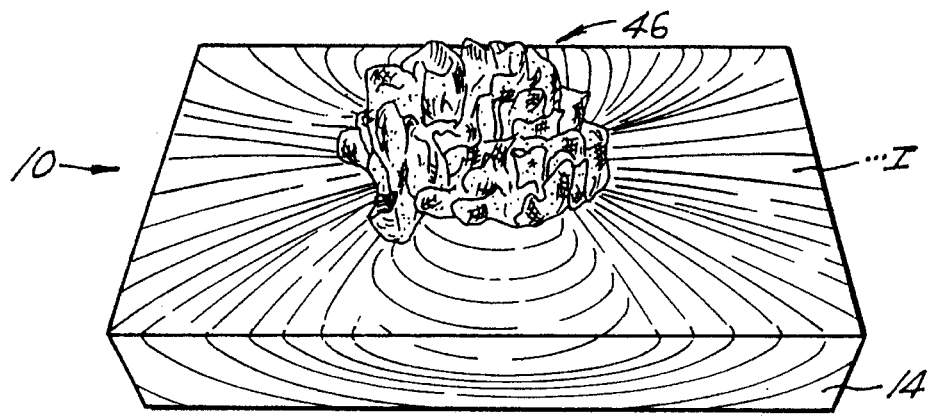
FIG. 4 is an environmental, perspective view of a closed position of the gift wrapping shown in FIG. 1.

In order for gift wrapping 10 to be altered from the partially closed position shown in FIG. 3 to the closed position shown in FIG. 4, it is necessary for main body 12 to substantially stretch. As mentioned previously, main body 12 is fabricated from a flexible and stretchable material, such as spandex. This material is capable of stretching or expanding to approximately twice its unstretched length in all directions. Therefore, for most conventionally shaped gift items, such as a square or rectangular box, gift wrapping 10 is capable of adequately covering the gift item when the surface area of side 44 is substantially less than the surface area of the entire gift item. This minimizes the amount of necessary material in the design of gift wrapping 10, and it also assures that gift wrapping 10 is usable with a plurality of differently dimensioned gift items.

Figure 5:
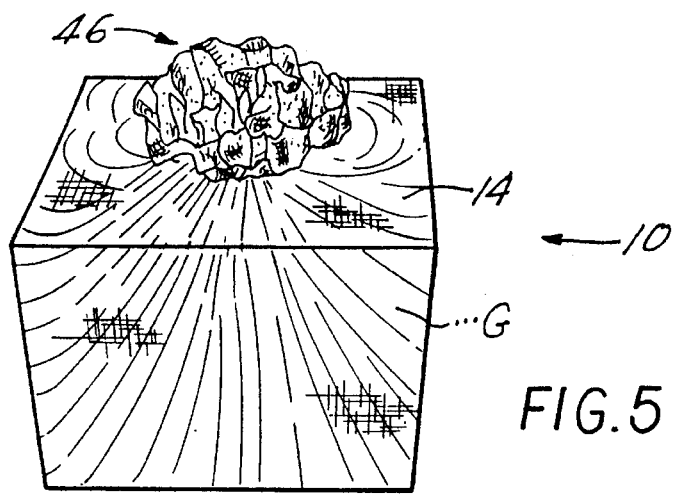
FIG. 5 is an environmental, perspective view of an alternative closed position of the gift wrapping shown in FIG. 1.

As illustrated in FIG. 4, decorative trim 22 adds aesthetic appeal to gift wrapping 10 by bunching around opening 38 when main body 12 is in the closed position. The bunched trim 46 hides both draw string mounting portion 16 and opening 38 when main body 12 is in either a closed or substantially closed position. Also, bunched trim 46 conceals slack from draw string 18 when it is positioned within opening 38, as discussed above. In FIG. 5, gift wrapping 10 is illustrated in a closed position around a gift item G having dimensions different from gift item I. Again, bunched trim 46 has successfully hidden opening 38 as well as the slack from draw string 18.

Figure 6:
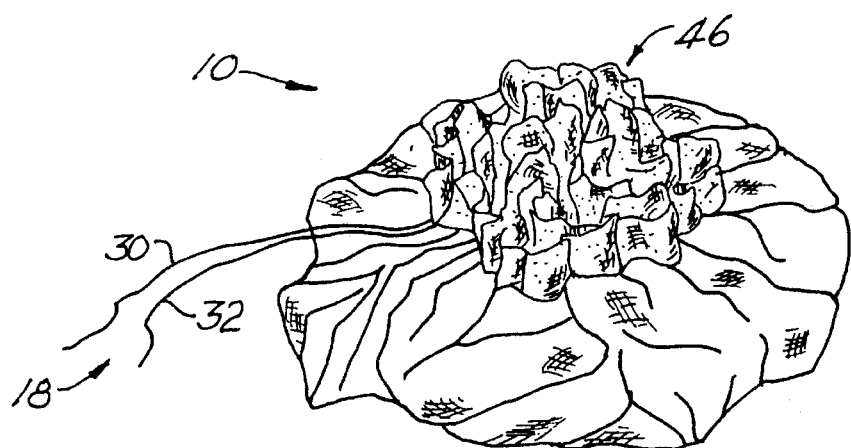
FIG. 6 is an environmental, perspective view of still another alternative closed position of the gift wrapping shown in FIG. 1.

In addition to being well suited to cover gift items requiring main body 12 to substantially stretch, gift wrapping 10 may also be utilized to cover most gift items having a surface area substantially less than the surface area of side 44 of gift wrapping 10. Although a gift item of this size may not be sufficiently expansive such that gift wrapping 10 can be tautly wrapped thereon, a supple material, such as crumpled paper, can be placed at various locations between the gift item and gift wrapping 10. In FIG. 6, gift wrapping 10 is illustrated to be closed around a small gift item (not shown) surrounded by a supple material (not shown). The supple material secures the gift item within gift wrapping 10, and it masks the actual size of the gift item, which is often desired when giving a gift.

Alternative embodiments of the invention are illustrated in FIGS. 7–10. Each of these embodiments are substantially similar to gift wrapping 10, except for the configuration of the decorative trim. In FIGS. 7 and 8, the gift wrapping 110 is shown to have a decorative trim 122 with two trailers 148,148, each extending away from main body 112, and each having a free end 152,154. In FIG. 7, main body 112 is illustrated in an open position. In FIG. 8, main body 112 is illustrated in a closed position, where trailers 148,148 are decoratively draped from bunched trim 146. If desired, either or both of these trailers 148,148 could be wrapped around bunched trim 146 to cover clasp 120.

In FIG. 9, the decorative trim 222 is illustrated to be discontinuous, where the trim section 256,256,256,256 are spaced apart from each other. Also shown in this figure is a gift tag 258 having a sleeve 260 for receiving one extent, or both 230 and/or 232, of draw string 218. This gift tag 258 can be utilized to show such information as the names of the persons giving and receiving the gift. Gift tag 258 can be fabricated from paper or from a material, such as plastic, that permits gift tag 258 to be reused. Of course, such a gift tag 258 could be utilized with gift wrappings 10,110.

In FIG. 10, four trailers 348,348,348,348 are illustrated. Each of these trailers 348,348,348,348 include a pair of end portions 362,364 secured to draw string mounting portion 316. The middle section 366 of each of these trailers 348,348,348,348 is free as it is not attached to draw string mounting portion 316. When main body 312 is maneuvered into the closed position, the free middle section 366 of each trailer 348,348,348,348 can be arranged to be decoratively spaced from draw string mounting portion 316. Of course, drawstring mounting portion 316 is the same as mounting portion 16, and may be constructed as shown in either FIG. 11 or FIG. 12, these two embodiments having been discussed at length above.

It is to be understood that the present invention is not limited to the embodiments described above, but encompasses any and all embodiments within the scope of the following claims. For example, the decorative trim can be configured to include combinations of the various decorative trims illustrated in each of the embodiments of the gift wrapping.

I claim:

1. A gift wrapping comprising:
   a main body, having a central portion and an edge portion, and a draw string mounting portion adjacent and circumferential to said edge portion, said central portion being fabricated entirely from an elastic fabric capable of stretching to twice its unstretched length in all directions;
   a draw string slidably disposed within said draw string mounting portion, said draw string having a first extent and a second extent, said first extent protruding outward from said draw string mounting portion at a first location, said second extent protruding outward from said draw string mounting portion at a second location, said first location being proximate to said second location, said first extent and said second extent being simultaneously displaceable to maneuver said main body between an open position and a closed position and
   decorative trim attached circumferentially to said main body edge portion wherein said decorative trim includes a trailer extending outwardly from said main body, said trailer having a free end.

2. The gift wrapping according to claim 1, wherein said decorative trim comprises spaced apart trim sections.

3. The gift wrapping according to claim 1, wherein said main body is substantially circular when in said open position.

4. The gift wrapping according to claim 1, wherein said main body is substantially flat and substantially planar.

5. The gift wrapping according to claim 1, further comprising a clasp secured to said draw string.

6. The gift wrapping according to claim 1, further comprising a gift tag attached to said draw string.

7. A gift wrapping comprising a main body, having a central portion and an edge portion, and a draw string mounting portion adjacent and circumferential to said edge portion, said draw string mounting portion having a first location and a second location each configured for passage of a draw string therethrough, said first location being proximate to said second location, said central portion being fabricated entirely from an elastic fabric capable of stretching to twice its unstretched length in all directions, said main body being maneuverable into an open position where said central portion is substantially flat and substantially planar and
   decorative trim attached circumferentially to said main body edge portion wherein said decorative trim includes a trailer extending outwardly from said main body, said trailer having a free end.

8. The gift wrapping according to claim 7, wherein said main body is substantially circular when in said open position.

9. A gift wrapping comprising:
   a main body having a central portion and an edge portion, and a draw string mounting portion adjacent and circumferential to said edge portion, said main body being substantially flat and substantially planar, said central portion being fabricated entirely from an elastic fabric capable of stretching to twice its unstretched length in all directions;
   a draw string slidably disposed within said draw string mounting portion, said draw string having a first extent and a second extent, said first extent protruding outward from said draw string mounting portion at a first location, said second extent protruding outward from said draw string mounting portion at a second location, said first location being proximate to said second location, said first extent and said second extent being simultaneously displaceable to maneuver said main body between an open position and a closed position, said main body being substantially circular when in said open position; and
   a decorative trim attached to said main body edge portion wherein said decorative trim includes a trailer extending outwardly from said main body, said trailer having a free end.

10. The gift wrapping according to claim 9, further comprising a clasp secured to said draw string.

* * * * *